(12) United States Patent
Connell, II et al.

(10) Patent No.: US 10,432,622 B2
(45) Date of Patent: Oct. 1, 2019

(54) SECURING BIOMETRIC DATA THROUGH TEMPLATE DISTRIBUTION

(71) Applicant: INTERNATIONAL BUSINESS MACHINES CORPORATION, Armonk, NY (US)

(72) Inventors: Jonathan H. Connell, II, Cortlandt-Manor, NY (US); Jae-Eun Park, Wappingers Falls, NY (US); Nalini K. Ratha, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 15/147,347

(22) Filed: May 5, 2016

(65) Prior Publication Data
US 2017/0324736 A1 Nov. 9, 2017

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01); *H04L 63/0428* (2013.01)

(58) Field of Classification Search
CPC .. H04L 63/0861; H04L 63/0428; G06F 21/32
See application file for complete search history.

(56) References Cited

U.S. PATENT DOCUMENTS 6,317,544 B1 11/2001 Diehl et al.
7,249,177 B1 7/2007 Miller
7,441,263 B1 * 10/2008 Bakshi .................. G06F 21/335
709/223
7,545,961 B2 6/2009 Ahern et al.
8,782,758 B2 7/2014 Kamakura
(Continued)

FOREIGN PATENT DOCUMENTS

EP 1962280 A1 8/2008
WO 2009082199 A1 7/2009

OTHER PUBLICATIONS

Anonymous; "Retail Fraud Taking a Greater Financial Toll According to LexisNexis® 4 Annual True Cost of Fraud Study"; Business Wire; Sep. 18, 2012; 4 pages.

*Primary Examiner* — Ghodrat Jamshidi
(74) *Attorney, Agent, or Firm* — Cantor Colburn LLP; Rahan Uddin (57) ABSTRACT

Embodiments include method, systems and computer program products for safeguarding biometric data. Aspects include receiving a first biometric data unit and generating a template based upon the first biometric data unit. Aspects also include sending the template to a plurality of external template storage devices, each template storage device having a unique device identifier. Aspects also include generating a biometric query including a second biometric data unit. Aspects also include sending the biometric query to at least some of the plurality of external template storage devices. Aspects also include receiving a match score from at least one of the plurality of template storage devices external to the processor, wherein the match score reflects the degree of similarity between the first biometric data unit and the second biometric data unit.

16 Claims, 7 Drawing Sheets

(56) References Cited

U.S. PATENT DOCUMENTS

| | | | |
|---|---|---|---|
| 8,959,586 B2 | 2/2015 | Pizano et al. | |
| 9,074,468 B1* | 7/2015 | Selman | E21B 47/122 |
| 9,524,422 B2* | 12/2016 | Thompson | G06F 17/15 |
| 9,646,476 B1* | 5/2017 | Hansen | G08B 21/14 |
| 2002/0010862 A1 | 1/2002 | Ebara | |
| 2002/0138438 A1* | 9/2002 | Bardwell | G06F 21/32 |
| | | | 705/51 |
| 2004/0250085 A1 | 12/2004 | Tattan et al. | |
| 2006/0056662 A1* | 3/2006 | Thieme | G06K 9/00067 |
| | | | 382/115 |
| 2006/0104485 A1* | 5/2006 | Miller, Jr. | G06K 9/00885 |
| | | | 382/115 |
| 2007/0150745 A1* | 6/2007 | Peirce | G06F 21/32 |
| | | | 713/186 |
| 2008/0101658 A1* | 5/2008 | Ahern | G06F 21/32 |
| | | | 382/115 |
| 2010/0109853 A1* | 5/2010 | Strohm | H04Q 9/00 |
| | | | 340/286.02 |
| 2011/0238432 A1* | 9/2011 | DeLoach | G06Q 10/087 |
| | | | 705/2 |
| 2013/0225129 A1 | 8/2013 | Norbisrath et al. | |
| 2014/0007210 A1 | 1/2014 | Murakami et al. | |
| 2014/0270421 A1 | 9/2014 | Khan et al. | |
| 2015/0033305 A1* | 1/2015 | Shear | G06F 21/57 |
| | | | 726/6 |
| 2016/0125296 A1* | 5/2016 | Filipuzzi | G06Q 10/10 |
| | | | 706/11 |
| 2016/0180150 A1* | 6/2016 | Negi | G06F 16/51 |
| | | | 382/118 |
| 2016/0226867 A1* | 8/2016 | Harding | H04L 63/0861 |
| 2016/0323274 A1* | 11/2016 | Chandrasekaran | H04L 63/0861 |
| 2017/0147827 A1* | 5/2017 | Bowers | G06F 21/577 |
| 2018/0082304 A1* | 3/2018 | Summerlin | G06N 3/04 |

\* cited by examiner

SECURING BIOMETRIC DATA THROUGH TEMPLATE DISTRIBUTION

BACKGROUND

The present disclosure relates generally to biometrics templates, and more specifically to methods, systems and computer program products for safeguarding biometric data.

Biometrics seeks to identify or recognize people based upon distinct characteristics attributable to the individual, such as finger prints, facial characteristics, and the like. Biometric data and authentication schemes that use biometrics have great potential in providing highly secure systems and, thus, the use of biometric security is on the rise. However, as with other forms of authentication data, biometric data is susceptible to a risk of increasingly sophisticated cyber-attacks. Biometrics can be stored in a biometric template. When a database of templates is compromised, millions of users can be impacted. In the United States alone in 2015, an estimated $355 million of mobile charges were fraudulent charges. A total merchant cost of around $1 billion is estimated to be associated with these fraudulent transactions and is on the rise, growing at a 30% rate per year. The need for security of biometric data is heightened because once biometric data is compromised, it is forever compromised because the biometric data owner cannot change their distinct characteristics, such as fingerprints.

SUMMARY

In accordance with an embodiment, a computer-implemented method for safeguarding biometric data is provided. The method includes receiving, by a processor, a first biometric data unit. The method also includes generating a template based upon the first biometric data unit. The method also includes sending the template to a plurality of template storage devices external to the processor, each template storage device having a unique device identifier. The method also includes generating, by the processor, a biometric query comprising a second biometric data unit. The method also includes sending the biometric query to at least some of the plurality of template storage devices external to the processor. The method also includes receiving, by the processor, a match score from at least one of the plurality of template storage devices external to the processor, wherein the match score reflects the degree of similarity between the first biometric data unit and the second biometric data unit calculated by a source template storage device.

In accordance with another embodiment, a computer program product for safeguarding biometric data is provided. The computer program product includes a computer readable storage medium having program instructions embodied therewith, the program instructions executable by a processor to cause the processor to receive a first biometric data unit. The processor is also configured to generate a template based upon the first biometric data unit. The processor is also configured to send the template to a plurality of template storage devices external to the processor, each template storage device having a unique device identifier. The processor is also configured to generate a biometric query comprising a second biometric data unit. The processor is also configured to send the biometric query to at least some of the plurality of template storage devices external to the processor. The processor is also configured to receive a match score from at least one of the plurality of template storage devices external to the processor, wherein the match score reflects the degree of similarity between the first biometric data unit and the second biometric data unit calculated by a source template storage device.

In accordance with a further embodiment, a processing system for safeguarding biometric data includes a non-transitory storage medium readable by a processing circuit and storing instructions for execution by the processing circuit. The processor is configured to receive a first biometric data unit. The processor is also configured to send the template to a plurality of template storage devices external to the processor, each template storage device having a unique device identifier. The processor is also configured to generate a biometric query comprising a second biometric data unit. The processor is also configured to send the biometric query to at least some of the plurality of template storage devices external to the processor. The processor is also configured to receive a match score from at least one of the plurality of template storage devices external to the processor, wherein the match score reflects the degree of similarity between the first biometric data unit and the second biometric data unit calculated by a source template storage device.

BRIEF DESCRIPTION OF THE DRAWINGS

The subject matter of the present disclosure is particularly pointed out and distinctly claimed in the claims at the conclusion of the specification. The foregoing and other features and advantages of the one or more embodiments disclosed herein are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
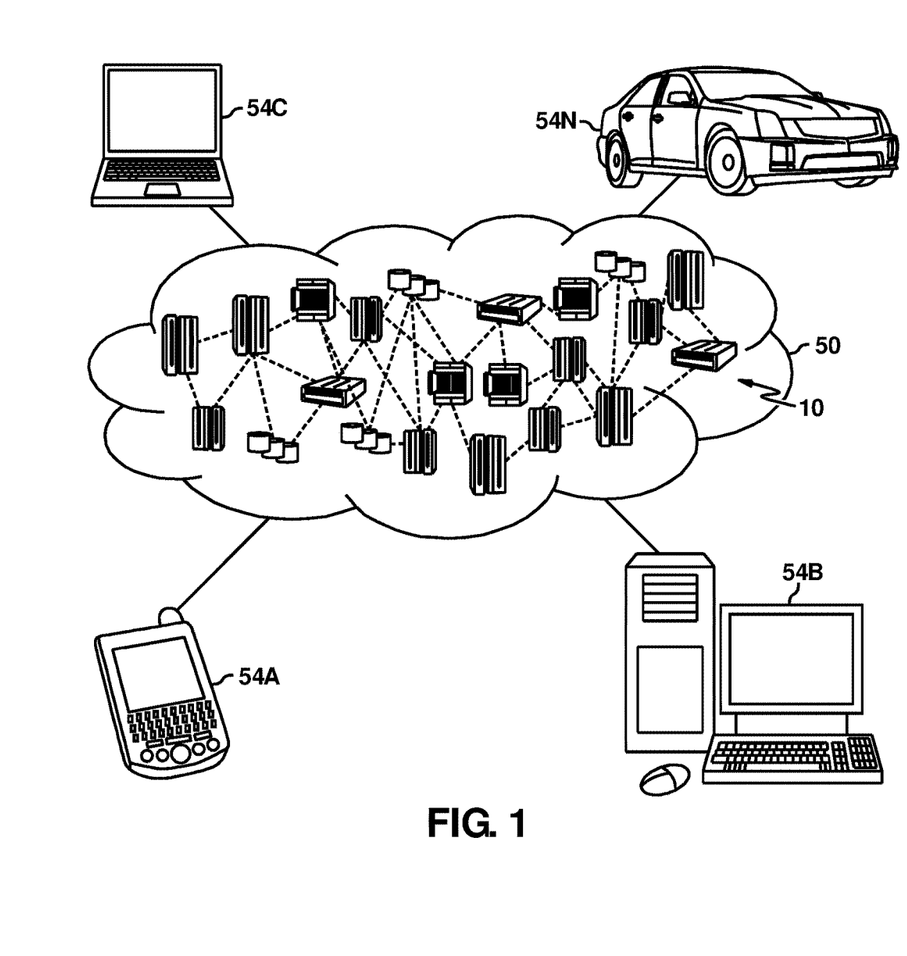
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
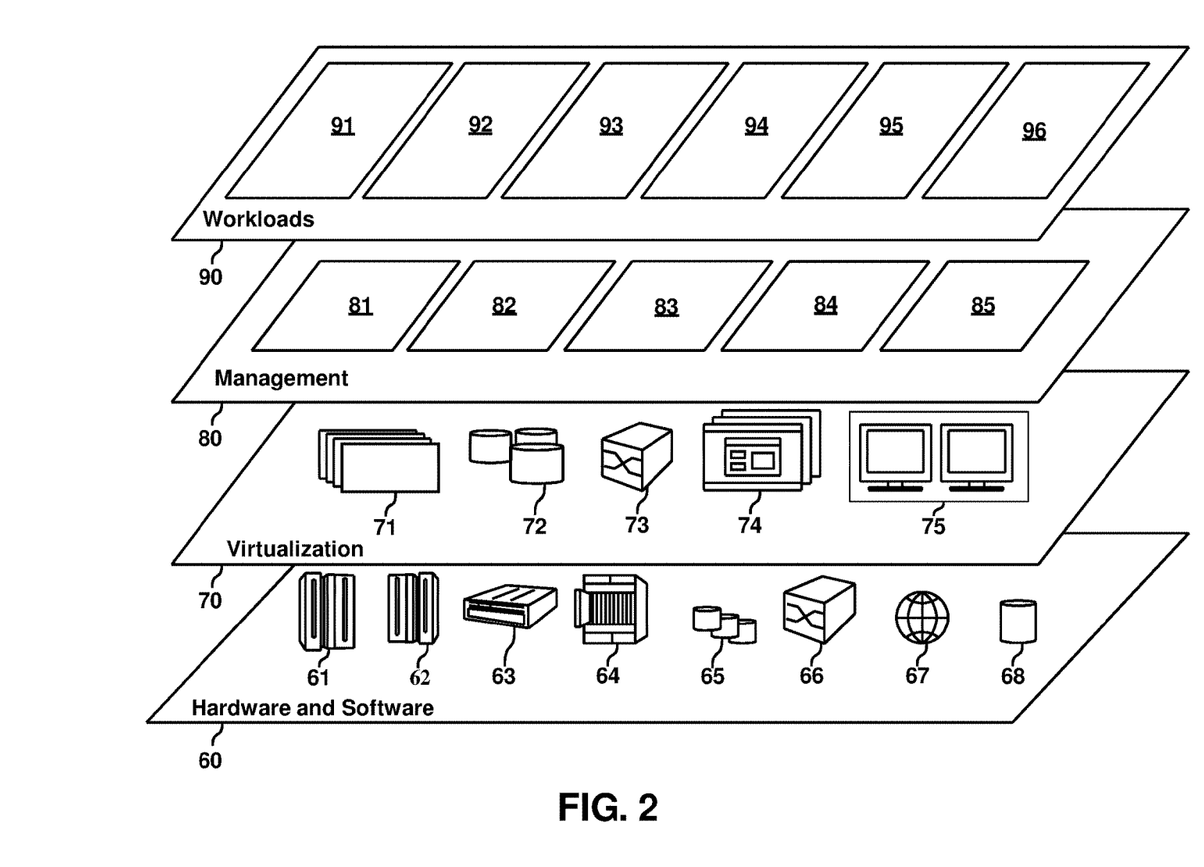
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data security and authentication 96.

In accordance with one or more embodiments of the disclosure, methods, systems and computer program products for reducing surface reflectance in photographs are provided.

Figure 3:
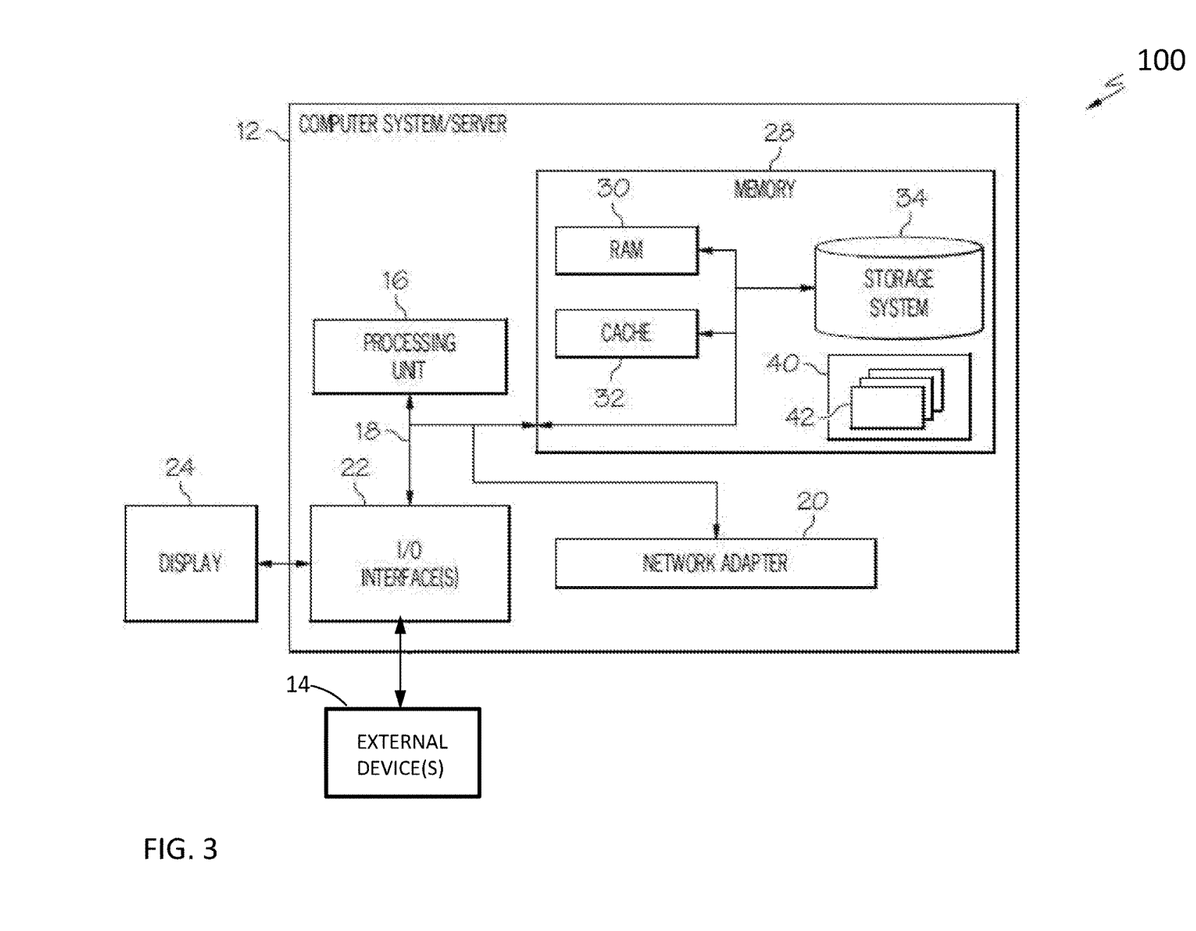
FIG. 3 is a computer system according to one or more embodiments.

Referring now to FIG. 3, a schematic of a cloud computing node 100 included in a distributed cloud environment or cloud service network is shown according to a non-limiting embodiment. The cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 100 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Turning now to an overview of the present disclosure, one or more embodiments provide systems and methodologies for safeguarding biometric data. More specifically, the present disclosure provides methods and systems for safeguarding biometric data through distribution of an encrypted biometric template to a plurality of networked devices. The networked devices can be any device external to the source of the biometric data template and may be connected, for instance, through a cellular network and/or a cloud computing network. More specifically, the systems and methodologies for safeguarding biometric data can store a template in full or part in a plurality of devices. By storing the data in a plurality of devices, it can be difficult to steal biometric data in bulk because it can be difficult to match a biometric template on an external device with its source. Moreover, the systems and methods of the disclosure can protect biometric data from alteration because a plurality of templates exist and each can be separately encrypted.

In accordance with the disclosure, a biometric template can be stored in full or part at multiple mobile devices on a network. Users can register their smart devices for participation in methods disclosed herein to obtain biometric data security features. A user device can generate a biometric template and then distribute it at multiple network sites, the number of sites depending on the level of protection or security desired. When a subsequent query is processed at the user device, it can be sent to multiple registered external devices. If an external device has a copy of the corresponding biometric template, the external device can determine a match score and report the score to the user device. Compromised versions of software and data can be readily detected without disruption of service due to data theft or loss.

Figure 4:
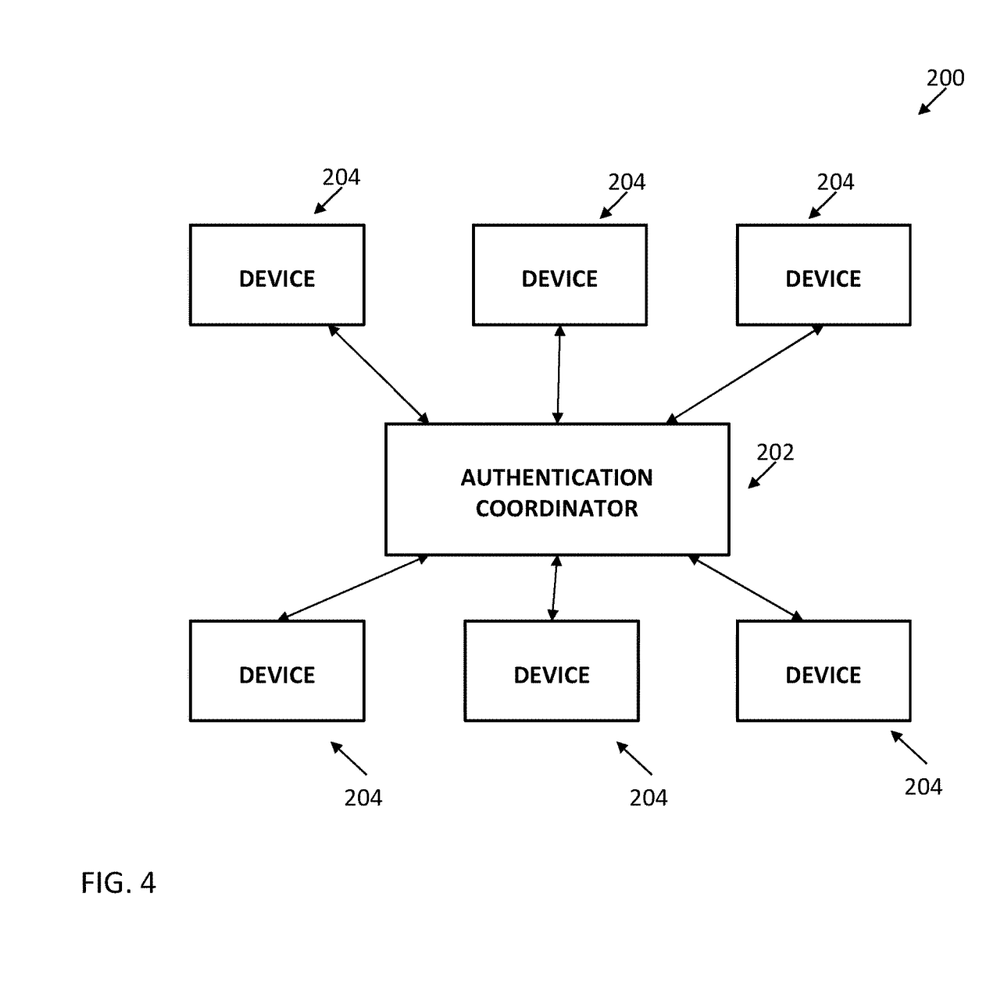
FIG. 4 is a block diagram illustrating a system for safeguarding biometric data according to one or more embodiments.

FIG. 4 is a block diagram illustrating a system 200 for safeguarding biometric data according to one or more embodiments. As is shown, the system 200 includes an authentication coordinator 202. The authentication coordinator 202 coordinates the authentication of biometric data for a user. For example, the authentication coordinator 202 can be a processing unit on a cellular or smart phone, a tablet, a laptop, or another networked device that receives biometric data. The authentication coordinator is in communication with a plurality of devices 204 external to the authentication coordinator. The devices 204 can be, for example, a plurality of smart phones in a wireless or wired network. Exemplary wireless and wired networks include, but are not limited to, cellular, Bluetooth, wi-fi, Ethernet, PSTN (public switched telephone system), Token ring, and the like. The devices 204 can be configured to receive biometric templates and queries from the authentication coordinator 202 and to compare the templates and queries to generate a match score. The authentication coordinator 202 can be configured to receive the match scores and determine whether to authenticate a user based upon the match scores. In some embodiments, the authentication coordinator is configured to assess the health of one or more devices 204 based upon their match score. For example, if one device has a low match score, while each other device has a high match score, the authentication coordinator 202 can investigate that device, designate the device or its data as corrupt, notify an external system of the need for action regarding that device, assess whether the software or data is corrupt or out of date, or update the software or data on that device.

The authentication coordinator 202 can interact with any number of devices on a network in accordance with the disclosure. For example, the authentication coordinator 202 can interact with, for example through the sending of templates and queries, a hundred devices 204 or more.

Figure 5:
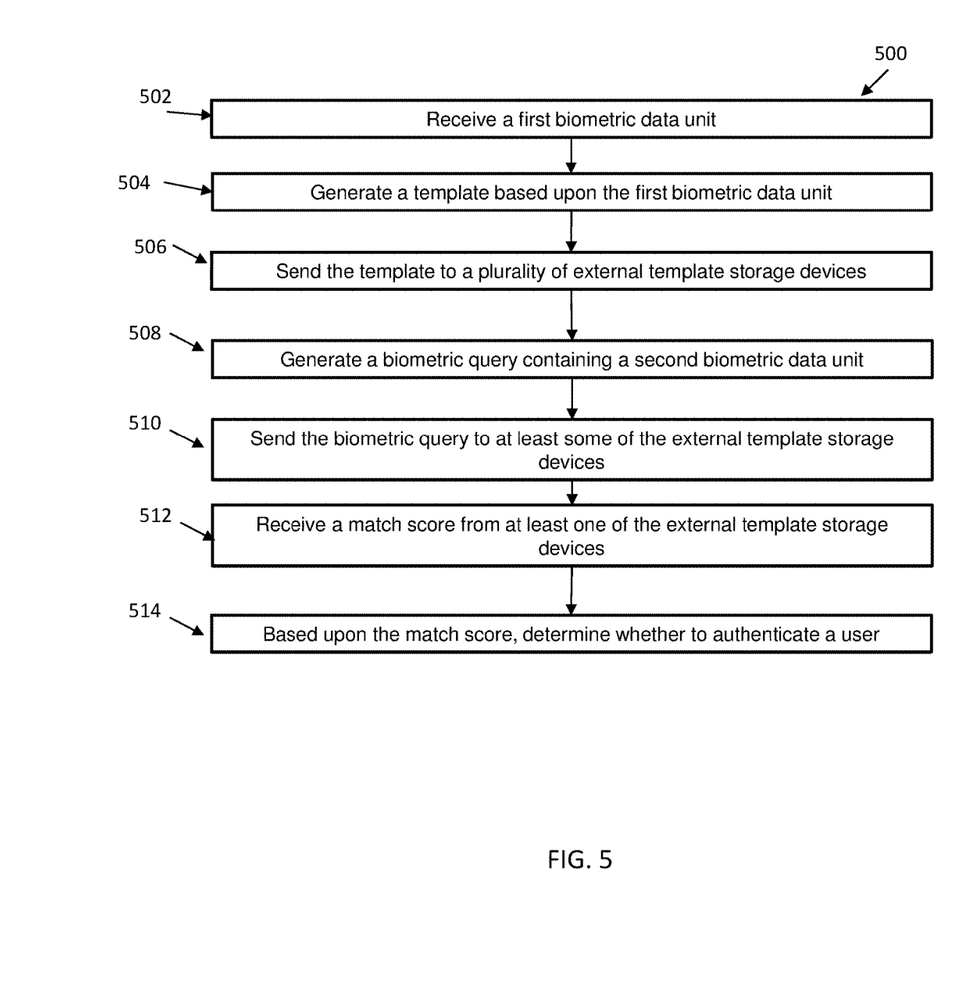
FIG. 5 is a flow diagram illustrating a method for safeguarding biometric data according to one or more embodiments.

Referring now to FIG. 5, a flow chart illustrating a method 500 for safeguarding biometric data. The method 500 includes, as shown at block 502, receiving a first biometric data unit. The method 500 also includes generating a template based upon the first biometric data unit, as shown at block 504. The method includes, as shown at block 506, sending the template to a plurality of external template storage devices. As shown at block 508, the method 500 includes generating a biometric query containing a second biometric data unit. The method 500 then includes sending the biometric query to at least some of the external template storage devices, as shown at block 510. Then, as shown at block 512, the method 500 includes receiving a match score from at least one of the external template storage devices. In some embodiments, as shown at block 514, based upon the match score, directly or indirectly, the method 500 determines whether to authenticate a user.

A biometric data unit is a unit of data containing one or more biometric signals. Biometric signals include computer data generated through a biometric process, such as fingerprints, genetic data (DNA sequence information), facial characteristics, electroencephalogram signals, electrocardiogram signals, iris scans, and the like. A biometric template is a digital representation of biometric data In some embodiments, the template storage devices and devices of the disclosure include any devices included on a network with storage and processing capabilities. For example, template storage devices include the cloud computing notes and local computing disclosed herein. In some embodiments, the template storage devices include cellular or smart phones, tablets, personal digital assistants, smart watches, laptop computers, or automobile computing systems.

In accordance with the disclosure, in some embodiments, a biometric query is generated. In some embodiments, the biometric query includes biometric data in need of authentication. For example, a biometric query can include a fingerprint scan on a smart phone for authentication of a user that is to be verified against a target biometric template. In some embodiments, a query is sent to all devices on a network. In some embodiments, a query is sent to a subset of devices on a network. In some embodiments, a query can be sent only to devices containing the target biometric template.

In some embodiments, methods include selecting a subset of template storage devices from the plurality of template storage devices based upon one or more characteristics and sending the biometric query to the subset of template storage devices. In an exemplary embodiment, the subset of template storage devices is based upon network availability. For instance, the subset of template storage devices can include only devices available on a wireless or wired network. In some embodiments, the subset of template storage devices is selected based upon multiple characteristics. In some embodiments, a subset of template storage devices can be selected based upon temporal characteristics. Temporal characteristics can include, for example, a time of last of use of the device, time of day, or frequency of use. In some embodiments, the subset of template storage devices is selected based upon geographic characteristics. Geographic characteristics can include, for example, spatial distribution, geopolitical boundaries, or proximity to the authentication coordinator. The subset of template storage devices can be selected based upon other characteristics, such as network speed, network type, device operating system, etc.

In some embodiments, an authentication coordinator generates a query that requests that a template storage device compare a template in a biometric query to the template stored on the template storage device. In some embodiments, the query can seek a comparison between the template in the biometric query and an identified target biometric template, wherein the target biometric template is an indexed template among a plurality of templates. For example, a template storage device can contain multiple biometric templates corresponding to multiple users. The biometric templates can be indexed by a unique identifier, such as an index number.

A match score reflects the degree of similarity between a first biometric data unit and a second biometric data unit. For example, a first biometric data unit can include biometric data provided by a user for later comparison and authentication against biometric queries. In some embodiments, a first biometric data unit contains biometric data associated authenticated to a user. In some embodiments, a second biometric data unit includes biometric data that has not been authenticated or that is in need of authentication. A match score can indicate whether or not a second biometric data unit is authentic. For example, if a match score indicates the first biometric unit and second biometric unit are similar to or equal to one another, a user associated with the second biometric unit can be authenticated. If a match score indicates the first biometric unit and second biometric unit are not similar to one another, a request for authentication associated with the user of the second biometric unit can be denied. In some embodiments match scores are consolidated to generate a match score. Methods for consolidating values, such as match scores, are known. For instance, methods for consolidating values can include averaging values, identifying maximum or minimum values, calculating a mean, calculating a median, calculating a majority vote, and the like.

Methods of encrypting and decrypting data, including biometric data, are known. In accordance with the disclosure, any methods of encrypting or decrypting data can be performed. For example, Data Encryption Standard (DES) refers to a widely used data encryption/decryption algorithm developed by IBM and adopted as a U.S. federal standard in 1976 by the National Institute of Standards and Technology (NIST). "Triple DES" is a more robust implementation of DES that can be adapted to DES applications to provide greater security. Other methods of encryption and decryption are known and are contemplated to be within the scope of this disclosure.

In some embodiments, a plurality of match scores are received from a plurality of template storage devices. For example, 50 template storage devices can each send a match score that can be received by a processor. In some embodiments, a plurality of match scores are consolidated to generate an authentication score.

In some embodiments, a match score or an authentication score can be compared to an authentication threshold or an integrity threshold. In some embodiments, a match score can be compared to an integrity threshold to generate a device match score for the source template storage devices. As used herein, the source template storage device is the template storage device that is the source of a particular match score.

An authentication threshold is a predetermined value related to the likelihood that a biometric signal is authentic to a user. An integrity threshold is a predetermined value representing a threshold desired integrity. The authentication threshold and integrity threshold can each vary based upon a number of factors, including, but not limited to, the desired level of security, the amount of measurement deviation in the biometric sensor, the ability of a given type of biometric data to uniquely identify an individual, and the method of consolidating match scores contemplated. In some embodiments, in response to a determination that the authentication score meets the authentication threshold, a method can include authenticating a user. In some embodiments, in response to a determination that the authentication score does not meet the integrity threshold, a method can include providing an output message indicating that the source template storage device is corrupt.

In some embodiments, in response to a determination that the authentication score does not meet the integrity threshold, a method can include denying authentication to a user. In some embodiments, in response to a determination that the authentication score does not meet an integrity threshold, a method can include providing an output message indicating that the template storage device is corrupt.

It is possible to compare individual match scores to one another or to an authentication score, to assess the health of the system and/or its components. For example, an erroneous match score relative to other values could indicate that a template storage device has a software version or biometric template that is out of date, corrupt or compromised. In some embodiments, an output message can be generated to signal an issue or potential issue associated with a template storage device.

In some embodiments, methods of the disclosure include comparing the match score to an integrity threshold to generate a device match score for the source template storage device. In some embodiments, responsive to a determination that the device match score does not meet the integrity threshold, methods of the disclosure include generating an output message comprising the device identifier corresponding to the source template storage device. In some embodiments, the output message includes a signal associating the source template storage device with a corrupt template storage device. The output message can include any information relevant to the health or identity of the template storage device. For example, the output message can include the unique device identifier of the template storage device. In some embodiments, the output message includes a signal associating the source template storage device with a corrupt template.

In some embodiments, a method includes excluding the corrupt source template storage device from receiving a subsequent biometric query. Such exclusion can be permanent or temporary. For example, an authentication coordinator can exclude the corrupt template storage device from a subset of template storage devices, for example by removing the corrupt template storage device from a set of available template storage devices external to the processor. In some embodiments, the corrupt template storage device can be reintroduced into a set of available template storage devices. For example, the corrupt template storage device can receive an updated template, updated software or other updates or modifications directed to allowing the device to meet the integrity threshold in appropriate circumstances. An updated or modified storage device can be designated to be included in subsequent biometric queries. For example, in the case of a failure to meet an integrity threshold due to software corruption on the storage device, an authentication coordinator can request that the storage device receive new or corrected software. The authentication coordinator can, for example, remove the storage device from a list of available template storage devices until it receives a notification that the storage device has new or corrected software.

When such notification is received, the authentication coordinator can add the storage device to the list of available template storage devices.

In some embodiments, methods of the disclosure include determining whether a device in the system has a software version or template that is out of date. For example, in some embodiments, responsive to a determination that the device match score does not meet the integrity threshold, a method according to the disclosure includes comparing a source template version number from the source template storage device with a user template version number for a user template. In some embodiments, responsive to a determination that the source template version number is later than the user template version number, methods of the disclosure can include sending the user template to the source template storage device. For example, a biometric template can be generated, and then subsequently updated after sending the template to external template storage devices. For a variety of reasons, the template storage devices that received the original template might not receive the update at the same time. For instance, where the template storage devices are phones in a wireless network, such as cellular phones, at the time a biometric template is updated, some of the template storage devices that received the original template could be offline. An out of date template could generate a match score that deviates from match scores of external template storage devices that received the updated template. Such deviations, and the source of such deviations, could be determined by an authentication coordinator.

In some embodiments, responsive to a determination that the device match score does not meet the integrity threshold, methods include comparing a software version of the source template storage device with a software version used by the processor. If a software version used by the processor or by a source template storage device is out of date, in some embodiments, the authentication coordinator can cause an update to the software.

The unique device identifier of the template storage device is any information that can be used to identify the device in a network. For example, the unique device identifier can be a device serial number, an IP address, a MAC address, a telephone number, or a number generated by an authentication coordinator. In some embodiments, a method includes storing a template location map, the template location map including the unique device identifiers.

Figure 6:
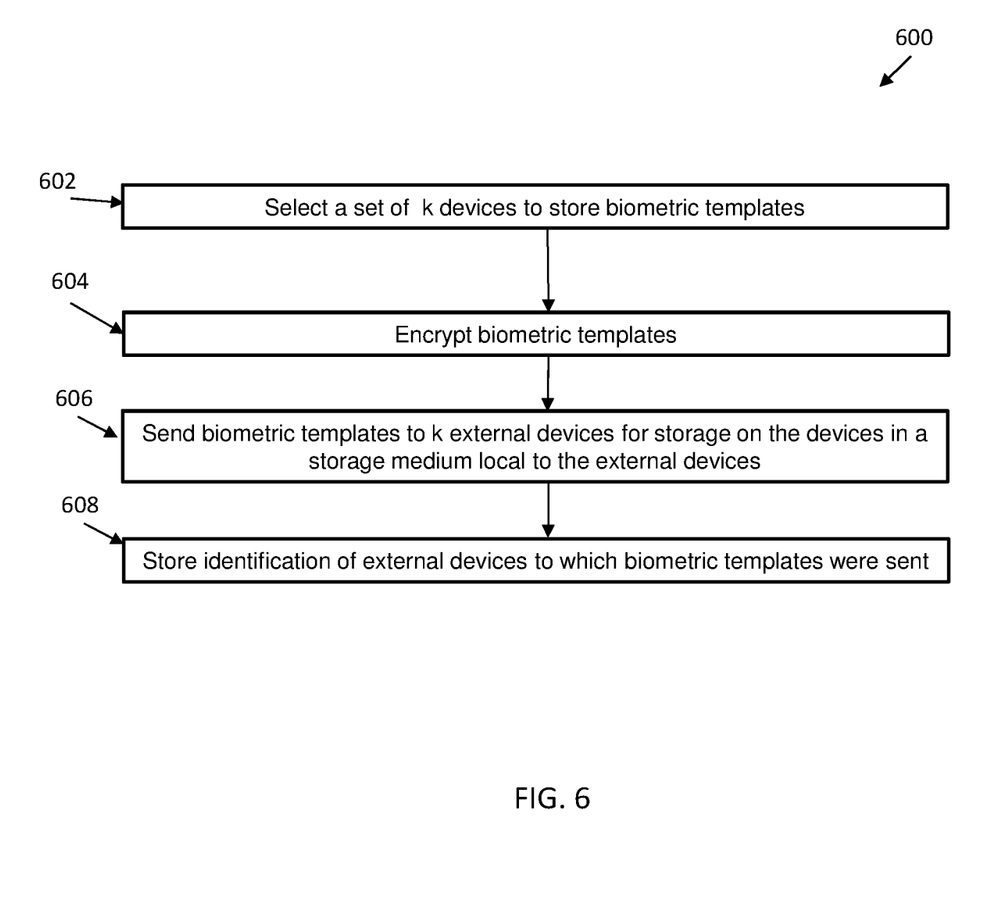
FIG. 6 is a flow diagram illustrating a method for enrolling a device in a system for safeguarding biometric data according to one or more embodiments.

Referring now to FIG. 6, a flow diagram illustrating a method 600 for enrolling a device in a system for safeguarding biometric data according to one or more embodiments is shown. The method 600 includes, as shown at block 602, selecting a set of k devices to store biometric templates. The method 600 also includes, as shown at block 604, encrypting the biometric templates. Then, as shown at block 606, the method 600 includes sending the biometric templates to k external devices for storage on the devices in a storage medium local to the external device. For example, where the external device is a tablet or smart phone, the biometric templates can be stored in memory on the tablet or smart phone. Then, as shown at block 608, an identification of external devices to which biometric templates were sent is stored.

For example, an authentication coordinator can select a set of k devices to store and maintain replicas of biometric templates. The authentication coordinator can encrypt the templates using different keys and send them to the selected devices. The devices can then store the templates locally, for example in conjunction with a local app. Optionally, a device, including a device selected by the authentication coordinator, can decline to store a template. The authentication coordinator can maintain a list of devices to which a template was sent and/or stored. The authentication coordinator can also, for example, store other template or device characteristics locally. For example, an authentication coordinator can store enrollment information in a table format as follows, wherein device identifier is a unique identifier for an external device, Number of Templates reflects the number of templates stored on the device, and template identifiers reflect the template identifiers on the external device:

| Customer | Storage locations |
|---|---|
| id0 | dev0:data7, dev435:data3, dev921:data14 |
| id1 | dev33:data2, dev78:data23, dev633:data19 |

Figure 7:
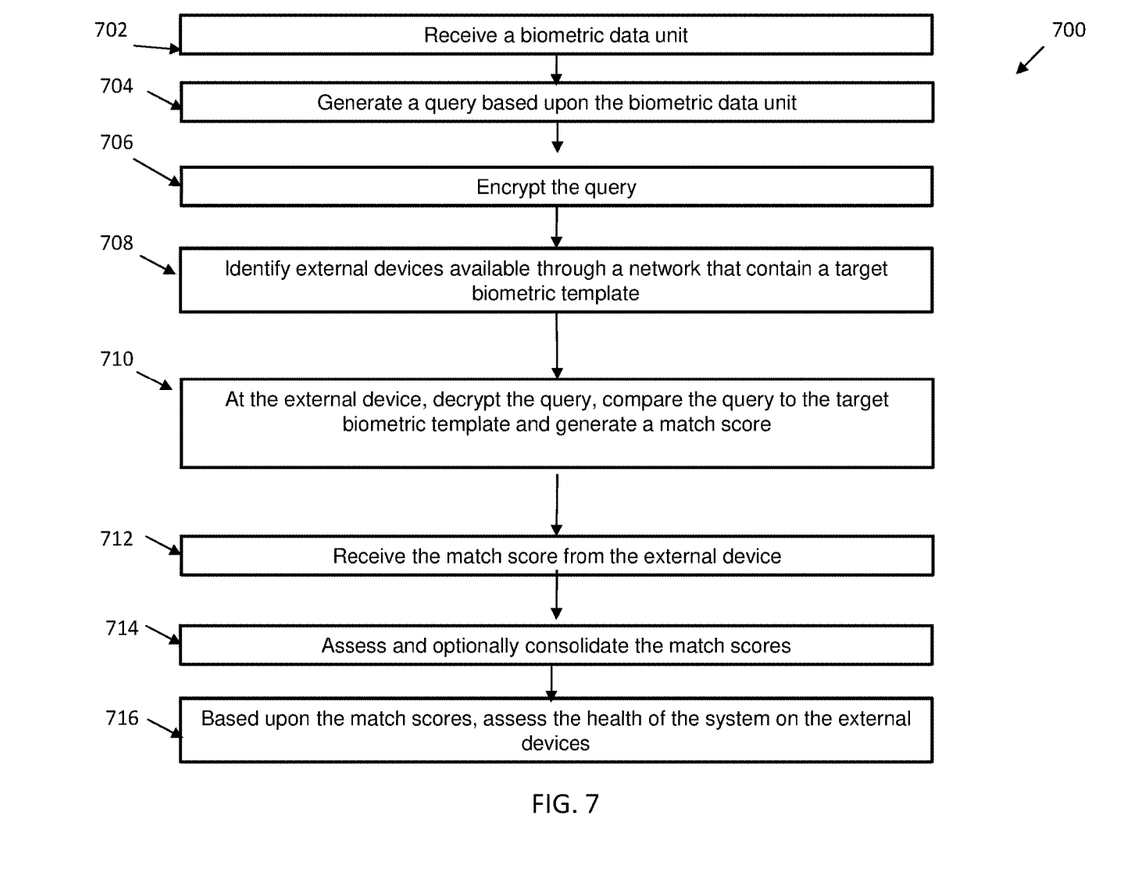
FIG. 7 is a flow diagram illustrating a method for verifying biometric data in a system for safeguarding biometric data according to one or more embodiments.

FIG. 7 is a flow diagram illustrating a method 700 for verifying biometric data in a system for safeguarding biometric data according to one or more embodiments. The method 700 includes, as shown at block 702, receiving a biometric data unit. The method 700 also includes, as shown at block 704, generating a query based upon the biometric data unit. The method 700 also includes, as shown at block 706, encrypting the query. The method 700 also includes, as shown at block 708, identifying external devices available through a network that contain a target biometric template. The method 700 also includes, as shown at block 710, at the external device, decrypting the query, comparing the query to the target biometric template, and generating a match score. The method 700 also includes, as shown at block 712, receiving the match score from the external device. The method 700 also includes, as shown at block 714, assessing and optionally consolidating the match scores. The method 700 also includes, as shown at block 716, based upon the match scores, assessing the health of the system on the external devices.

Thus, it can be seen from the forgoing detailed description that one or more embodiments of the present disclosure provide technical effects and benefits. The present disclosure provides enhanced security for biometric data across a wireless or wired network. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for safeguarding biometric data, the method comprising:
   receiving, by a processor, a first biometric data unit;
   generating a template based upon the first biometric data unit;
   sending the template to a plurality of template storage devices external to the processor, each template storage device having a unique device identifier;
   generating, by the processor, a biometric query comprising a second biometric data unit;
   sending the biometric query to at least some of the plurality of template storage devices external to the processor;
   receiving, by the processor, a plurality of match scores from at least some of the plurality of template storage devices external to the processor, wherein the match scores reflect the degree of similarity between the first biometric data unit and the second biometric data unit calculated by a source template storage device;
   consolidating the plurality of match scores to generate an authentication score, and comparing the authentication score to an authentication threshold;
   comparing the plurality of match scores to an integrity threshold to generate device match scores for the some of the plurality of template storage devices; and
   notifying an external system of the need for action regarding one of the some of the plurality of template storage devices when the one of the some of the plurality of template storage devices has a device match score that is lower than the other device match scores for the other of the some of the plurality of template storage devices.

2. The computer-implemented method of claim 1, further comprising, responsive to a determination that the authentication score meets the authentication threshold, authenticating a user.

3. The computer-implemented method of claim 1, wherein the template storage devices are wireless devices distributed in a network.

4. The computer-implemented method of claim 1, further comprising, responsive to a determination that the device match score does not meet the integrity threshold, generating an output message comprising the device identifier corresponding to the template storage device and a signal indicating that the template storage device is corrupt.

5. The computer-implemented method of claim 4, further comprising excluding the template storage device from receiving a subsequent biometric query.

6. The computer-implemented method of claim 1, further comprising, responsive to a determination that the device match score does not exceed the integrity threshold, comparing a source template version with a user template version number for a user template, and, responsive to a determination that the source template version number is later than the user template version number, sending the user template to the source template storage device.

7. The computer-implemented method of claim 1, further comprising, responsive to a determination that the device match score does not meet the integrity threshold, comparing a software version number of the source template storage device with a software version number used by the processor.

8. The computer-implemented method of claim 1, further comprising storing a template location map, the template location map comprising the unique device identifiers.

9. The computer-implemented method of claim 1, wherein the biometric data unit comprises a plurality of biometric signals.

10. The computer-implemented method of claim 1, further comprising encrypting the template.

11. The computer-implemented method of claim 1, comprising selecting a subset of template storage devices from the plurality of template storage devices based upon network availability, and sending the biometric query to the subset of template storage devices.

12. The computer-implemented method of claim 11, comprising selecting the subset of template storage devices based upon at least one of a temporal characteristic and a geographic characteristic.

13. A computer program product for safeguarding biometric data, the computer program product comprising a non-transitory computer readable storage medium having program instructions embodied therewith, the program instructions executable by a processor to cause the processor to:
receive a first biometric data unit;
generate a template based upon the first biometric data unit;
send the template to a plurality of template storage devices external to the processor, each template storage device having a unique device identifier;
generate a biometric query comprising a second biometric data unit;
send the biometric query to at least some of the plurality of template storage devices external to the processor;
receive a plurality of match scores from at least some of the plurality of template storage devices external to the processor, wherein the match scores reflect the degree of similarity between the first biometric data unit and the second biometric data unit calculated by a source template storage device;
consolidate the plurality of match scores to generate an authentication score, and compare the authentication score to an authentication threshold;
compare the plurality of match scores to an integrity threshold to generate device match scores for the some of the plurality of template storage devices; and
notify an external system of the need for action regarding one of the some of the plurality of template storage devices when the one of the some of the plurality of template storage devices has a device match score that is lower than the other device match scores for the other of the some of the plurality of template storage devices.

14. The computer program product of claim 13, wherein the program instructions executable by a processor cause the processor to, responsive to a determination that the authentication score exceeds the authentication threshold, authenticate a user.

15. The computer program product of claim 13, wherein the program instructions executable by a processor cause the processor to compare the match score to an integrity threshold to generate a device match score for the source template storage device.

16. A processing system for safeguarding biometric data, comprising:
a non-transitory storage medium readable by a processing circuit and storing instructions for execution by the processing circuit, the processing circuit configured to:
receive a first biometric data unit;
generate a template based upon the first biometric data unit;
send the template to a plurality of template storage devices external to the processor, each template storage device having a unique device identifier;
generate a biometric query comprising a second biometric data unit;
send the biometric query to at least some of the plurality of template storage devices external to the processor;
receive, by the processor, a plurality of match scores from at least some of the plurality of template storage devices external to the processor, wherein the match scores reflect the degree of similarity between the first biometric data unit and the second biometric data unit calculated by a source template storage device;
consolidate the plurality of match scores to generate an authentication score, and compare the authentication score to an integrity threshold;
compare the plurality of match scores to an integrity threshold to generate device match scores for the some of the plurality of template storage devices; and
notify an external system of the need for action regarding one of the some of the plurality of template storage devices when the one of the some of the plurality of template storage devices has a device match score that is lower than the other device match scores for the other of the some of the plurality of template storage devices.

* * * * *